April 28, 1959 A. Z. CZIPOTT ET AL 2,884,507

PHOTOCONDUCTIVE DEVICE AND METHOD OF MAKING SAME

Filed Oct. 1, 1956

AKOS Z. CZIPOTT
ACEY L. FLOYD
INVENTORS

BY [signature]
AGENT

United States Patent Office 2,884,507

Patented Apr. 28, 1959

2,884,507

PHOTOCONDUCTIVE DEVICE AND METHOD OF MAKING SAME

Akos Z. Czipott, Alhambra, and Acey L. Floyd, Duarte, Calif., assignors, by mesne assignments, to Dresser Industries, Inc., Dallas, Tex., a corporation of Delaware Application October 1, 1956, Serial No. 613,171

9 Claims. (Cl. 201—63)

This invention relates to photoconductive devices, and more particularly to devices of that class having a surficial coating or layer of finely divided photoconductive material, and to novel procedures utilized in producing such devices.

It is known how photoconductive cells of the powder-layer type may be produced. Recently highly sensitive cells of that type have been made. See, for example, the report of Nicol-Kazon in the journal of the Optical Society of America, vol. 45, page 647. In cells of the type concerned, the photosensitive material is composed principally or entirely of cadmium sulphide with the possible admixture of a minor proportion of cupric chloride as a so-called "impurity." Such cells of the powder-layer cadmium sulphide type have, however, been non-linear, that is, not linear in their voltage-current relationship. For example, in the article cited, the current was stated to have varied as the fourth or fifth power of the voltage. This non-linearity of the electrical characteristics of cells of the type under consideration is undesirable. Further, the degree of non-linearity is not uniform from cell to cell.

Prior art also indicates that sintered cadmium sulphide photocells may be ohmic in character, as is evidenced by the report of Thomson and Bube in the Review of Scientific Instruments, vol. 26, page 664. It is thought that the non-ohmic character of powder-layer cadmium sulphide cells may be due to barriers existing between the powder particles. Such barriers might be removed or eliminated by sintering the cadmium sulphide powder particles.

In view of the noted non-ohmic characteristics of prior art cadmium sulphide powder-layer photoconductive cells, it is a primary object of the present invention to provide cells of the cadmium sulphide powder-layer type which are ohmic in character. An additional object of the present invention is to provide a procedure for producing powder-layer cadmium sulphide photoconductive cells possessed of linear current versus voltage characteristics. Another object of the present invention is to provide an ohmic photoconductive surficial layer on a base surface. Other objects and advantages of the present invention will hereinafter be made or become apparent in conjunction with consideration of the following description of a preferred embodiment of photoconductive cell produced in accordance with the principles of the invention, and the procedure of making such cell.

An exemplary cell according to the principles of the present invention is illustrated in the accompanying drawings in which.

Figure 1:
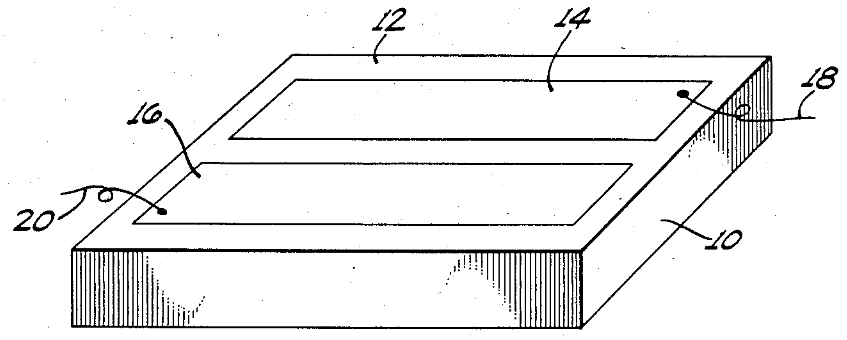
Figure 1 is a representation of an exemplary photoconductive cell base with suitable electrodes applied.

Referring now to the drawings, there is designated by numeral 10, an exemplary cell base 10, preferably in the form of a block of electrically insulative material such as glass or quartz. Base 10 provides a surface 12 adapted for reception of a layer of photoconductive or potentially photoconductive material. The base 10 may have applied in any suitable fashion an arrangement or array of electrodes, here illustrated by electrodes 14 and 16, formed as metallic films adherent upon the base. Such metallic films may be applied or affixed to the electrically insulative base in any suitable fashion as, for example, in a manner and by means disclosed in a copending patent application of Acey L. Floyd, Serial No. 489,397, filed February 21, 1955. The electrodes 14, 16 may have connected thereto in any suitable manner as by soldering, electrical leads 18, 20, respectively, for conduction of current to and from the electrodes of the completed photoconductive cell. While the exemplary base 10 as illustrated is of simple rectangular block configuration, it will be understood that a base of any desired shape and configuration may be employed, it being essential only that the base present a suitable surface upon which the photoconductor material may be received.

The cell unit thus far described is adapted to have deposited on its surface 12 between and interconnecting electrodes 14 and 16, an application or deposit of photoconductor material. In accordance with a concept of the invention, preparation of a substance or material capable of providing an ohmic photoconductive layer on a surface of the cell may proceed as follows. First, a mass of cadmium sulphide is sintered, preferably to clinker form. The thus sintered cadmium sulphide is next ground into a fine powder form and screened to eliminate all large particles. Small portions of finely divided cupric chloride and cadmium chloride are next mixed with the cadmium sulphide powder, care being taken that the mixture is uniform throughout to ensure an ohmic contact between the particles of the mixture thus formed. Additionally, one percent of cadmium acetate may also be added to a water mixture of the prepared photoconductor material, to enhance linearity in the characteristics of the completed cell.

Figure 2:
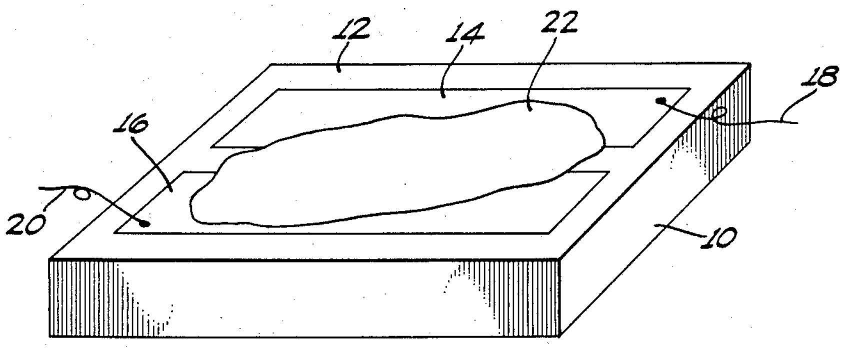
Figure 2 is a view of the cell unit depicted in Figure 1 with a surficial layer of a wet mixture thereto applied in accordance with the principles of the invention.
Figure 3:
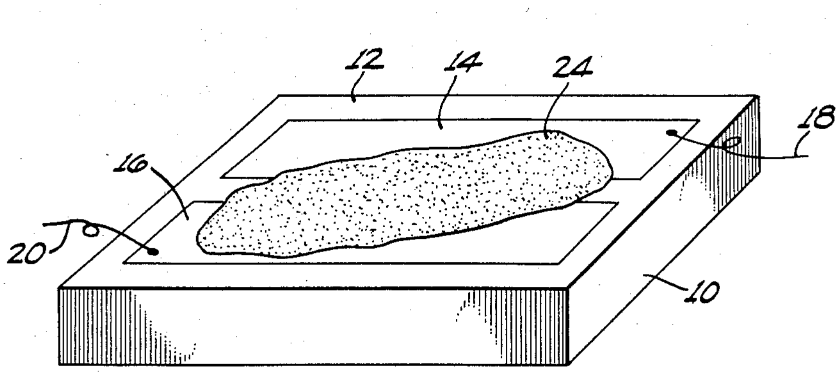
Figure 3 is a view of the completed photoconductive cell resulting from treatment of the unit depicted in Figure 2.

Some of the liquid mixture or slurry produced by the procedure explained in the preceding paragraph is applied in a thin uniform layer on surface 12 of base 10 and in contact with or overlying electrodes 14 and 16, and the applied deposit or layer is then dried. After drying, the cell and the applied deposit of photoconductor material is heated in air to a temperature slightly below the diffusion temperature of cadmium sulphide (417° C.). The layer or deposit of photoconductive material as applied to surface 12 and electrodes 14, 16, is indicated by numeral 22 in Figure 2; the deposit there depicted being of somewhat irregular areal extent for purposes of illustration only. When heated, the deposit of material 22 on the surface of the cell base undergoes changes including loss of the organic component of the cadmium acetate solution, the changes leaving free cadmium dispersed in the layer of photoconductive material. It is thought the free cadmium acts to more effectively electrically interconnect the particles of photoconductor material. The photoconductive layer thus produced is highly photosensitive and ohmic in character.

While the proportions of the various components of the mixture applied to cell surface 12 may be varied to some extent, it is preferred that the proportion of cupric chloride to cadmium sulphide be within the range indicated in the beforementioned prior art, and that the proportion of cadmium chloride be approximately 500 parts per million of cadmium sulphide with about one percent of cadmium acetate if the latter is added, all on a basis of weight of metal component. In accord with the advantages and features disclosed in copending concurrently filed application of Acey L. Floyd and Akos Z. Czipott, Serial No. 613,172 filed October 1, 1956, electrodes 14 and 16 may be and preferably are, formed of indium or an indium alloy; although any other suitable metallic electrodes may be employed.

It is evident that in the light of the preceding disclosure of a preferred embodiment of photoconductive cell and method of producing the latter in accord with the concept of the invention, modifications thereof will become apparent to those skilled in the art; and accordingly it is desired to be not limited to the specific details of those specific and exemplary illustrations of the invention, but what is claimed is:

1. A photoconductive device comprising: a layer-like deposit of a mixture of finely divided photoconductive material comprising principally powdered cadmium sulphide, a modicum of powdered cupric chloride and powdered cadmium chloride in a quantity of approximately 500 parts per million parts of cadmium sulphide in the mixture, said deposit mixture having been baked at a temperature below the diffusion temperature of said cadmium sulphide.

2. A photocell unit comprising: an insulating base surface; spaced-apart electrodes on said base surface; and a layer of material on said base surface and extending between and electrically interconnecting said electrodes, said layer being formed essentially of an aqueous powder mixture composed mainly of powdered cadmium sulphide, and a minor portion each of cupric chloride and powdered cadmium chloride, which aqueous mixture layer has been dried and baked on said base surface at a temperature slightly lower than the diffusion temperature of the cadmium sulphide.

3. An ohmic photoconductive device comprising: an insulating base surface; spaced-apart electrodes on said surface; and an ohmic layer of photoconductive material on said surface electrically interconnecting said electrodes, said layer being formed of a baked-on material composed principally of a powdered mixture comprising principally powdered cadmium sulphide, and minor amounts of powdered cupric chloride, powdered cadmium chloride and cadmium deposited from cadmium acetate, which mixture has been baked on said surface at a temperature slightly below the diffusion temperature of said cadmium sulphide.

4. A method of producing an ohmic photoconductive layer comprising: applying to an insulating surface member a thin layer of an aqueous slurry composed principally of powdered cadmium sulphide and minor portions of powdered cupric chloride and powdered cadmium chloride, and subjecting the base and the said slurry layer thereon to a temperature slightly less than the diffusion temperature of said cadmium sulphide for a time sufficient to form a dry layer of the mixture adherent to said surface.

5. A method of producing an ohmic photoconductive layer comprising: applying to an insulating surface member a thin layer of an aqueous slurry composed principally of powdered cadmium sulphide and minor portions of powdered cupric chloride and powdered cadmium chloride, the quantity of said cadmium chloride being in the proportion of approximately 500 parts per million parts of said cadmium sulphide in the slurry and the quantity of said cadmium acetate being approximately one percent by weight of the total solids in the slurry, and subjecting the base and the said slurry layer thereon to a temperature slightly less than the diffusion temperature of said cadmium sulphide for a time sufficient to form a dry layer of the mixture adherent to said surface.

6. A method of producing an ohmic photoconductive layer comprising: applying to an insulating surface member a thin layer of an aqueous slurry composed principally of powdered cadmium sulphide and minor portions of powdered cupric chloride, powdered cadmium chloride and cadmium acetate, and subjecting the base and the said slurry layer thereon to a temperature slightly less than the diffusion temperature of said cadmium sulphide for a time sufficient to form a dry layer of the mixture adherent to said surface.

7. The method of producing an ohmic photoconductive layer comprising: sintering a mass of cadmium sulphide; forming a fine powder of the sintered cadmium sulphide; admixing with the thus-formed powdered cadmium sulphide minor portions of powdered cupric chloride, powdered cadmium chloride, cadmium acetate and sufficient water to form a plastic slurry thereof; forming a layer of the thus-formed slurry on an insulating base surface; drying the said slurry layer; and then heating the resultant dried layer on said base surface to a temperature slightly below the diffusion temperature of cadmium sulphide.

8. The method of producing an ohmic photoconductive layer comprising: sintering a mass of cadmium sulphide; forming a fine powder of the sintered cadmium sulphide; admixing with the thus-formed powdered cadmium sulphide minor portions of powdered cupric chloride, powdered cadmium chloride, cadmium acetate and sufficient water to form a plastic slurry thereof, the quantity of said cadmium chloride being in the proportion of approximately 500 parts per million parts of said cadmium sulphide and the quantity of said cadmium acetate being approximately 1 percent by weight of the total solids in the mixture; forming a layer of the thus-formed slurry on an insulating base surface; drying the said slurry layer; and then heating the resultant dried layer on said base surface to a temperature slightly below the diffusion temperature of cadmium sulphide.

9. The method of producing an ohmic photoconductive layer comprising: sintering a mass of cadmium sulphide; forming a fine powder of the sintered cadmium sulphide; admixing with the fine powdered cadmium sulphide thus formed minor portions of powdered cupric chloride and powdered cadmium chloride to form a powder mix, the quantity of said cadmium chloride being in the proportion of approximately 500 parts per million parts of said cadmium sulphide in the mixture; forming a slurry of said mix together with an aqueous solution of cadmium acetate; forming a layer of the thus-resulting slurry on an insulating base surface; drying the said layer of the slurry on said base surface; and then heating the resulting dried layer on said base surface to a temperature slightly below the diffusion temperature of cadmium sulphide.

References Cited in the file of this patent

UNITED STATES PATENTS

| | | |
|---|---|---|
| 2,651,700 | Gans | Sept. 8, 1953 |
| 2,727,118 | Longini et al. | Dec. 13, 1955 |
| 2,742,550 | Jenness | Apr. 17, 1956 |
| 2,765,385 | Thomsen | Oct. 2, 1956 |